United States Patent
Khmelev et al.

(10) Patent No.: US 12,393,979 B1
(45) Date of Patent: Aug. 19, 2025

(54) SYSTEM AND METHOD FOR VEHICULAR TRACKING

(71) Applicant: United Services Automobile Association (USAA), San Antonio, TX (US)

(72) Inventors: Yevgeniy Viatcheslavovich Khmelev, San Antonio, TX (US); Susan Elizabeth Wright, San Antonio, TX (US); David M. Jones, Jr., San Antonio, TX (US); Michael Anthony Miller, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 18/334,912

(22) Filed: Jun. 14, 2023

Related U.S. Application Data (63) Continuation of application No. 17/198,782, filed on Mar. 11, 2021, now Pat. No. 11,699,181.

(60) Provisional application No. 63/002,695, filed on Mar. 31, 2020.

(51) Int. Cl.
G06Q 40/00 (2023.01)
G06N 20/00 (2019.01)
G06Q 30/0645 (2023.01)
G06Q 40/03 (2023.01)
G07C 5/08 (2006.01)

(52) U.S. Cl.
CPC ............ G06Q 40/03 (2023.01); G06N 20/00 (2019.01); G06Q 30/0645 (2013.01); G07C 5/0816 (2013.01); G07C 5/0841 (2013.01)

(58) Field of Classification Search
CPC .... G06Q 40/03; G06Q 30/06; G06Q 30/0645; G06N 20/00; G07C 5/0816; G07C 5/0841
USPC .................................................. 705/4, 35–45
See application file for complete search history.

(56) References Cited

U.S. PATENT DOCUMENTS

| | | | | |
|---|---|---|---|---|
| 10,703,383 | B1* | 7/2020 | Chan | G07C 5/008 |
| 10,895,463 | B1* | 1/2021 | Cope | G06Q 40/08 |
| 2015/0371153 | A1* | 12/2015 | Lohmeier | G06Q 40/03 |
| | | | | 705/5 |
| 2018/0075380 | A1* | 3/2018 | Perl | G06Q 40/08 |
| 2019/0102689 | A1* | 4/2019 | Lassoued | G07C 5/085 |
| 2019/0347582 | A1* | 11/2019 | Allen | G06Q 10/02 |
| 2020/0173808 | A1* | 6/2020 | Beaurepaire | G06Q 10/02 |

\* cited by examiner

*Primary Examiner* — Mike Anderson
*Assistant Examiner* — Mohammed H Mustafa
(74) *Attorney, Agent, or Firm* — Fletcher Yoder, P.C.

(57) ABSTRACT

Disclosed are systems and methods for supporting safe vehicle use. Specifically, machine learning is applied to identify and accumulate data from electronic services. The machine learning is further used to identify risk associated with a potential use of a vehicle. The identified risk is a basis for safety customizations of the vehicle, based upon capabilities of the vehicle.

20 Claims, 4 Drawing Sheets

SYSTEM AND METHOD FOR VEHICULAR TRACKING

RELATED CASES

The present disclosure is a continuation of U.S. patent application Ser. No. 17/198,782, titled "SYSTEM AND METHOD FOR VEHICULAR TRACKING," which was filed on Mar. 11, 2021, and claims priority to, U.S. Provisional Patent Application Ser. No. 63/002,695, titled "SYSTEM AND METHOD FOR VEHICULAR TRACKING," which was filed on Mar. 31, 2020, and which is herein incorporated by reference in its entirety for all purposes.

BACKGROUND

The present disclosure relates generally to systems and methods for facilitating tracking related to vehicles. In particular, the present disclosure relates to systems and methods for facilitating/improving online vehicle sharing services.

The technological age has brought about many changes in the physical world. One of those changes is an increase in the sharing economy. The sharing economy is a peer-to-peer based activity model for acquiring, providing, or sharing access to goods and services, oftentimes facilitated by a technological platform. With an ever-increasing number of users seeking to avail themselves of products and services in this manner, the technological platforms are often in an adolescent phase, lacking sophisticated back-end systems to enable efficient sharing. For example, one new offering in the sharing economy pertains to vehicle loaning. Technological platforms have been created that allow lenders to offer out their vehicles for periodic usage to lendees. Unfortunately, however, many problems may arise under such offers. For one, not all lendees are the same. Some lendees may be more likely than others to provide caution when utilizing a loaned vehicle or a vehicle of a particular type. Further, other material factors may impact whether a lender may be willing to lend their vehicle. Additionally, certain vehicle protections may erode when adding a vehicle to a sharing economy.

Unfortunately, the current technological platforms used to facilitate these shared economy transactions are quite simplistic, not providing enough information for the lender to make an educated decision regarding whether to lend their vehicles. Accordingly, there is a need to improve and/or supplement the existing technology platforms, ensuring adequate provision of information vital to efficient sharing.

SUMMARY

Implementations of the present disclosure are generally directed to systems and methods for facilitating/improving online vehicle sharing service platforms. In particular, a browser plugin or inline service may be implemented to provide additional information pertaining to a potential lend than that which is provided by online vehicle sharing service platforms.

It is appreciated that methods in accordance with the present disclosure may include any combination of the aspects and features described herein. That is, methods in accordance with the present disclosure are not limited to the specific combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

As mentioned above, the FIG. 1 is a schematic diagram of a system 100 with lender support services 102 supplementing a vehicle lending technology platform 104, according to implementations of the present disclosure. Specifically, the vehicle lending services platform 104 includes a website and structures for facilitating sharing of vehicles by lenders 106A and 106B (e.g. those owning a vehicle) with lendees 108A and 108B (e.g., those requesting a vehicle via the vehicle lending services platform 104). The Lenders 108A and 108B may offer their vehicles, a sports car and a mini-van, respectively, to perspective lendees, via the vehicle lending services platform 104.

Figure 1:
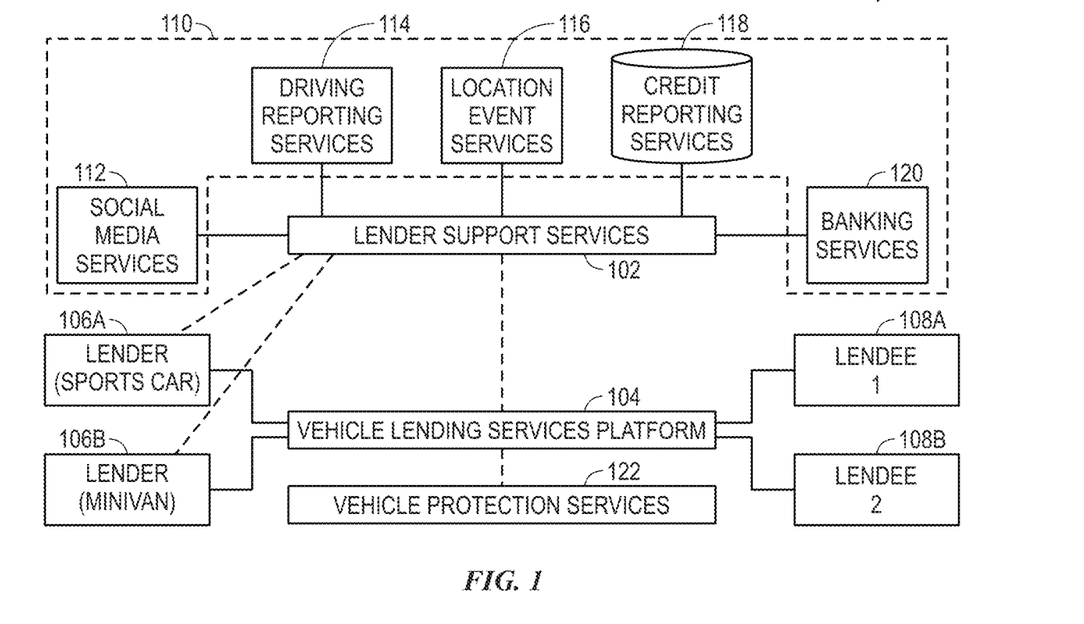
FIG. 1 is a schematic diagram of a system with lender support services supplementing a vehicle lending technology platform, according to implementations of the present disclosure.

As mentioned above, the vehicle lending services platform 104 may not provide sufficient information to enable lenders to make educated decisions regarding whether to lend their vehicles to perspective lendees. Thus, the lender support services 102 may be integrated into vehicle lending services platform 104 to supplement the process with additional information.

The lender support services 102 may glean information relevant to a potential lend from a multitude of relevant electronic services 110. For example, the lender support services 102 may communicatively couple (e.g., via application programming interfaces) with social media services 112, driver reporting services 114, location/event services 116, credit reporting services 118, and/or banking services 120 to obtain relevant information to a potential lending of a vehicle. In some embodiments, the lender support services 102 may use machine learning with the gleaned information from the electronic services 110 to calculate risk scores for a potential lend.

For example, machine learning circuitry may access accumulated data (e.g., from one or more electronic services 110) stored in universal fields of a data store to identify patterns of the data. Because data is provided from a multitude of diverse online services, new data patterns not previously attainable may emerge. As used herein, machine learning refers to algorithms and statistical models that computer systems use to perform a specific task without using explicit instructions, relying instead on patterns and inference instead. In particular, machine learning generates a mathematical model based on sample data, known as "training data", in order to make predictions or decisions without being explicitly programmed to perform the task.

Additional services may be informed of the predicted risk. For example, the risk score may be provided to vehicle protection services 122, which may be charged with protecting the vehicle (e.g., via insurance coverage) in case of damage or other loss associated with lending. Depending on the risk score, the vehicle protection services 122 may adjust a protection premium that is charged to the lender or the lendee. This adjustment may be provided to the vehicle lending services platform 104 prior to completion of a potential lend, enabling near-real-time updates to costs that may be incurred by the lender and/or the potential lendee.

As mentioned above, a multitude of electronic services 110 may provide relevant information used to identify risk. For example, the social media services 112 may provide specific information pertaining to a particular lendee. In some embodiments, intentions of the lendee may be obtained via social media information pertaining to the lendee. For example, the lendee 108A may have indicated an intention (e.g., a like, a comment, a share, etc.) relating to an event (e.g., a car racing event) in a vicinity of the vehicle of the lender 106A. The event type may indicate a potential use for the vehicle (e.g., racing), which may be material to whether the lender 106A may lend out their vehicle.

Driver reporting services 114 may also provide valuable information. For example, the driver reporting services 114 may provide a driving record or a subset of driving record information that provides an indication of whether the potential lendee is likely to speed, have an accident, etc.

In some instances, the location/event services 116 may also provide relevant information. For example, the location/event services 116 may provide an indication of events occurring near the location of the vehicle to be loaned. For example, the location/event services 116 may indicate that a car racing event is occurring near the location of the vehicle of the lender 106A. In some instances, to reduce bandwidth utilization and/or decrease processing latencies by the lender support services 102, events provided by the location/event services 116 may be filtered based upon particular criteria. In some embodiments, events may be filtered based upon events that may positively or negatively impact a risk score for a particular type of vehicle. For example, the lender support services 102 may provide an indication of the type of vehicle being offered (e.g., a sportscar) and may receive a filtered set of events from the location/event services 116 that particularly pertain to use of a sports car. For example, a racing event may indicate a possible use in racing, which may increase a risk score, while a car show event may indicate showing the car, which may decrease a risk score.

Interestingly, credit scores may provide a good prediction of how risky allowing operation of a vehicle is. Typically, the higher the credit score the lower the risk of allowing operation of a vehicle. Thus, credit reporting services 118 may provide an indication of credit score for a potential lendee, which may be used in a risk assessment of a potential lend.

Banking services 120 may also provide relevant information to a potential lend. For example, purchase history of a lendee may provide an indication of a risk level associated with the lendee.

As mentioned above, machine learning may use the accumulated data from the online services 110 to identify risk. Depending on the inferences to be made, the machine learning circuitry may implement different forms of machine learning. For example, in some embodiments (e.g., when particular known examples exist that correlate to future predictions that machine learning circuitry will be tasked with generating) supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects are. It has applications in ranking, recommendation systems, visual identity tracking, face verification, and speaker verification.

Additionally and/or alternatively, in some situations, it may be beneficial for the machine-learning circuitry to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

Cluster analysis is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. Other methods are based on estimated density and graph connectivity.

Risk predictions may be derived by the machine learning circuitry. For example, risk associated with particular events, particular vehicle types, particular vehicle lending locations, particular lendees, etc. may be predicted and numerated by a risk score. As will be discussed in more detail below, the risk score may be provided to the lender 106A and/or 106B, enabling the lender 106A and/or 106B to make an informed decision as to whether to lend their vehicle.

As will be discussed in more detail below, particular graphical user interface (GUI) features may be rendered based upon the risk score, particular application features/functions may be enabled based upon the risk score, etc. This may greatly enhance user experiences with vehicle lending.

Figure 2:
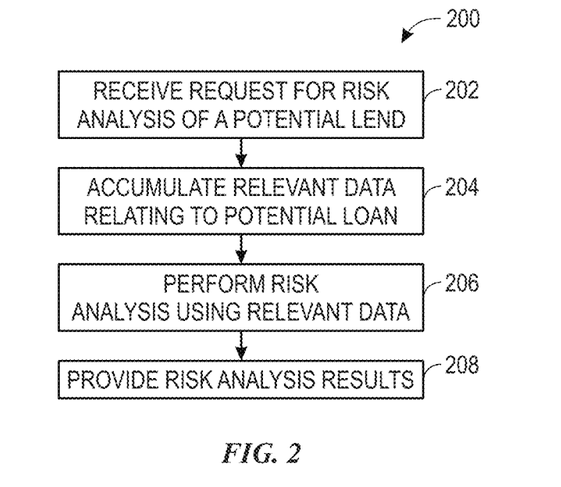
FIG. 2 is a flow diagram illustrating a process for providing lendee risk to a lender, according to implementations of the present disclosure.

Turning now to a more detailed discussion of determining risk, FIG. 2 is a flow diagram illustrating a process 200 for providing lendee risk to a lender, according to implementations of the present disclosure. The process 200 begins by receiving a request for risk analysis of a potential lend (block 202). For example, the request may be triggered automatically based upon a request from lendee to be loaned a vehicle, may be triggered based upon a graphical user interface-initiated request by the lender, etc.

The request may be lendee specific and/or may be specific to a hypothetical lending time, lending location, etc. For example, in the case of a request triggered automatically by a request of a potential lendee to be loaned a vehicle, the request may correspond to the potential lendee, the time that the lendee is requesting to be loaned the vehicle, and/or the location where the vehicle will be loaned. However, when the request is triggered based upon a GUI input, the request may pertain to a lendee-independent risk analysis that does not involve a particular lendee.

Next, relevant data relating to the potential loan is obtained (block 204). As may be appreciated, this relevant information may dynamically change based upon the type of request. For example, when a lendee-independent risk analysis is requested, particular lendee social media information, driving record information, etc. may not be collected. In contrast, when a lendee-specific risk analysis is requested, lendee-specific information may be obtained.

Next, a risk analysis is performed using the relevant data (block 206). As mentioned above, there are many techniques that may be applied to derive an indication of risk. For example, in some embodiments, a quantification of a speeding tickets and/or accidents indicated in a driving report may be assigned a particular risk adjustment, which may be applied to an overall risk. In some embodiments, complex machine learning algorithms may provide supervised or unsupervised machine learning to identify a risk.

The risk analysis may be numerated/quantified, to provide a relatively simplistic indication of risk associated with the potential lend indicated in the request. For example, depending on the level of complexity/granularity of the risk assessment, the risk analysis may be normalized to a particular scale of risk (e.g., High, medium, low for simplistic assessments, 1-50 for medium complexity risk assessments, and/or 1-100 for high complexity risk assessments having a high degree of granularity).

The risk analysis results may be then be provided (block 208). For example, an electronic packet indicative of the quantified risk score may be provided to the lender (e.g., lender 106A of FIG. 1), the vehicle lending services platform 104 facilitating the lending, and/or the vehicle protection services 122 charged with protecting the vehicle from damage or other loss. The risk score may be used by these systems to adjust factors of the potential lend. For example, a protection cost may increase, causing a monetary quote for the lend to rise. Additionally, the lender may be apprised of additional material information as to whether to complete the potential lend.

Figure 3:
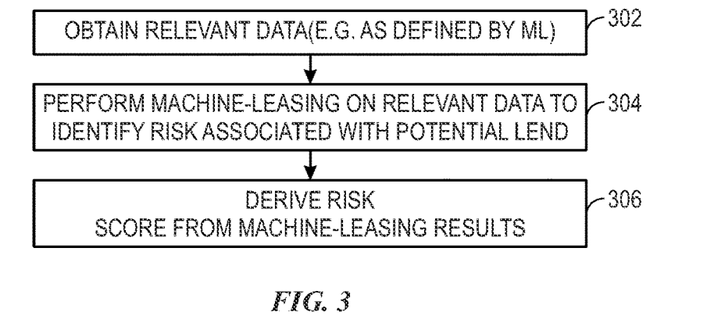
FIG. 3 is a flow diagram illustrating a process for calculating a risk score used in the process of FIG. 2, according to implementations of the present disclosure.

FIG. 3 is a flow diagram illustrating a process 300 for calculating a risk score used in the process of FIG. 2, according to implementations of the present disclosure. The process 300 begins by obtaining relevant data from the electronic services 110 (block 302). For example, machine learning algorithms (e.g. described above) may identify, from a large set of factors provided by the electronic services 110, which factors are key factors likely to influence risk associated with a potential lend. Once the key factors are identified, information requested from the electronic services 110 may be limited primarily to these factors, reducing bandwidth usage and/or increasing processing efficiencies of the lender support services 102.

Machine-learning may be performed on the relevant data to identify risk associated with the potential lend (block 304). As mentioned above, patterns in the key factors may indicate relative risk, which may be quantified as a risk score (block 306). For example, depending on the level of complexity/granularity of the risk assessment, the risk analysis may be normalized to a particular scale of risk (e.g., High, medium, low for simplistic assessments, 1-50 for medium complexity risk assessments, and/or 1-100 for high complexity risk assessments having a high degree of granularity).

Figure 4:
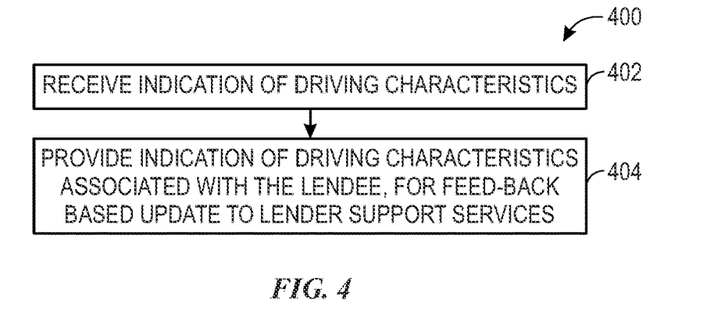
FIG. 4 is a flow diagram of a process for observing and reporting characteristics of a lendee, according to implementations of the present disclosure.

In some embodiments, feedback may be provided to update the machine learning algorithms with new data. This may help determine how accurate the risk analysis is and provide additional learning, which may further enhance the risk analysis. FIG. 4 is a flow diagram of a process 400 for observing and reporting characteristics of a lendee, according to implementations of the present disclosure.

Figure 5:
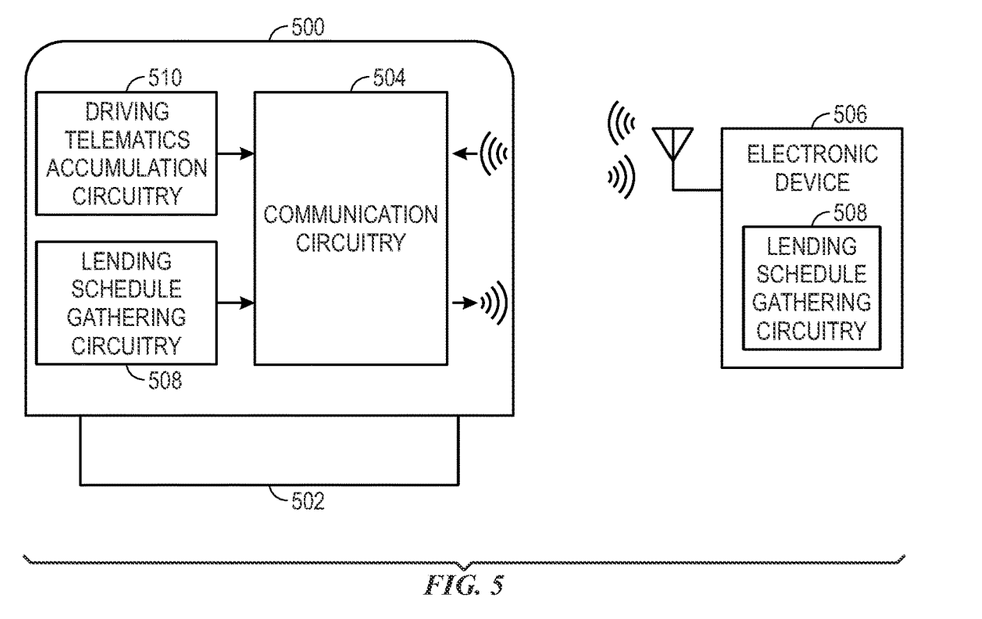
FIG. 5 is a schematic diagram of an electronic device used to facilitate the process of FIG. 4, according to implementations of the present disclosure.

The process 400 begins with receiving an indication of driving characteristics of the lendee with the vehicle of the lender (block 402). For example, FIG. 5 is a schematic diagram of an electronic device 500 used to capture driving information, according to implementations of the present disclosure. The electronic device 500 includes a communications port 502 that enables communicative coupling 502 to an Onboard Diagnostics (OBD) port of a vehicle. Via this coupling, the electronic device 500 may obtain driving data, such as magnitudes of speed traveled, magnitudes of braking, lane departure information, etc. As may be appreciated, this information may be used to perform a qualitative analysis of the lendee's driving of the lender's vehicle.

The electronic device 500 may include communications circuitry 504 that enables communicative coupling with a second electronic device 506. For example, the communications circuitry 504 may implement a communications protocol, such as the Transmission Control Protocol/Internet Protocol (TCP/IP) or Bluetooth protocol. The second electronic device 506 may provide, via the communicative coupling, an indication of lending schedule or times to collect driving data to the lending schedule gathering circuitry 508. A processor of the electronic device 500 may collect driving data during these times, attributing the driving to the scheduled lendee. In other embodiments, the second electronic device 506 may maintain these schedules and attribute particular driving data received with a particular lendee based upon these schedules.

The driving telematics accumulation circuitry 510 accumulates driving data received via the OBD port of the vehicle. This driving data is associated with a particular lendee by determining the lendee schedule from the lending schedule gathering circuitry 508. The driving information may be provided to the second electronic device 506 via the communication circuitry 504.

The second electronic device 506 may then provide an indication of driving characteristics associated with the lendee, as feedback to the lender support services 102 (block 404 of FIG. 4). This feedback may be used to update the machine learning with results of how well the lender operated the vehicle.

Figure 6:
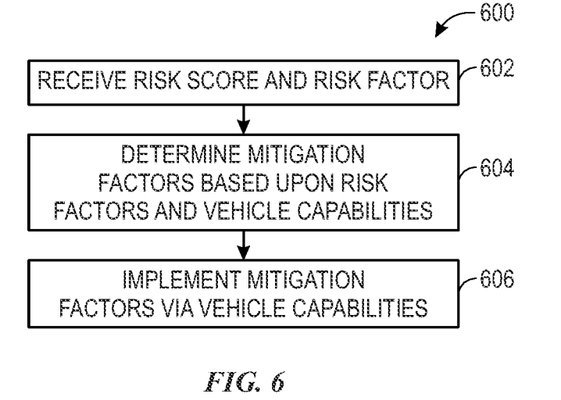
FIG. 6 is a process for mitigating risk factors for vehicle sharing, according to implementations of the present disclosure.

In some embodiments, risk mitigation may be implemented. FIG. 6 is a process 600 for mitigating risk factors for vehicle sharing, according to implementations of the present disclosure. The process 600 includes receiving a risk score and risk factors from the lender support services 102 (block 602).

The risk factors may be identified as data patterns that cause an adjustment upward in the risk score. For example, if identified speeding of a lendee has caused an increase in the risk score, this may be a risk factor. It may be desirable to mitigate these risk factors. For one, this may reduce a monetary cost of the vehicle protection services 122. Further, this may provide peace of mind for the lender, enabling vehicle lending in situations where the lender may not otherwise lend their vehicle.

Certain vehicles have features that may be implemented to mitigate identified risk factors. For example, some vehicles have speed limiting functionality that, when enabled, governs the maximum speed to a pre-set limit. In some vehicles, certain configurable settings for driving features may be set. For example, some vehicles may include lane departure systems with dynamically adjustable sensitivities. A database of vehicle features may be maintained, enabling the lender support services 102 to identify mitigation factors based upon the risk factors and vehicle capabilities (block 604).

Figure 7:
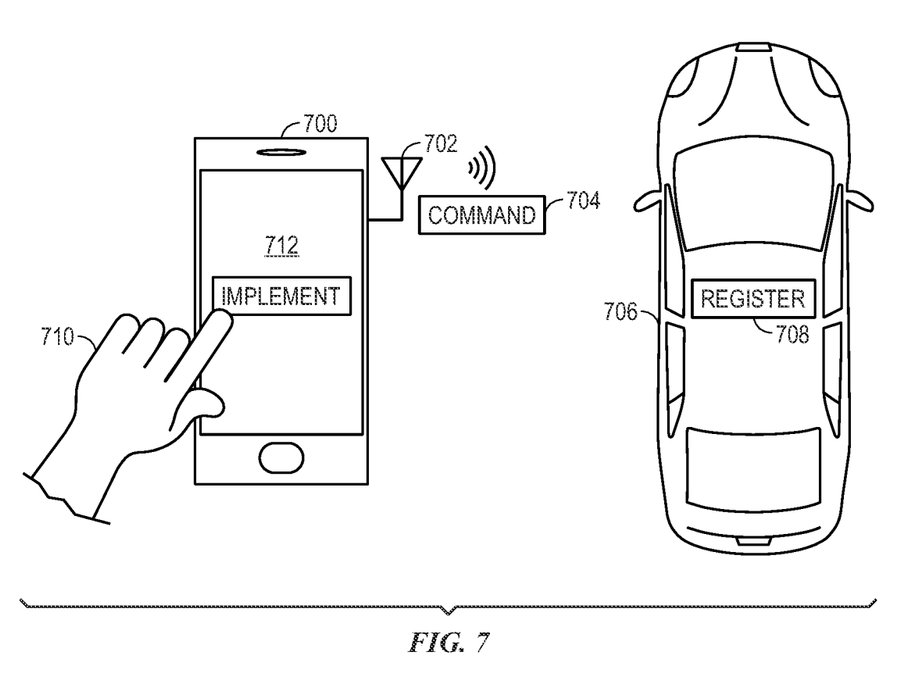
FIG. 7 is a schematic diagram illustrating implementation control, according to implementations of the present disclosure.

Based upon the identified mitigation factors, the mitigation factors may be implemented (block 606). For example, FIG. 7 is a schematic diagram illustrating implementation control, according to implementations of the present disclosure. The electronic device 700 includes communications circuitry 702 that enables command(s) 704 to be delivered to a vehicle 706. For example, the command 704 may cause vehicle 706 configuration adjustments by causing data to be stored in one or more registers 708 of the vehicle 706. This may cause the vehicle 706 to implement mitigation factors, such as governing a maximum speed, increasing a lane departure sensing sensitivity, etc.

The command 704 delivery may be triggered by the electronic device 700, via a user input 710 via a graphical user interface (GUI) 712. In some embodiments, the command 704 delivery may be triggered automatically at set times (or the command 704 may include a set time for initiation of the command 704), where the set time may be based upon a time of the lending of the vehicle.

Figure 8:
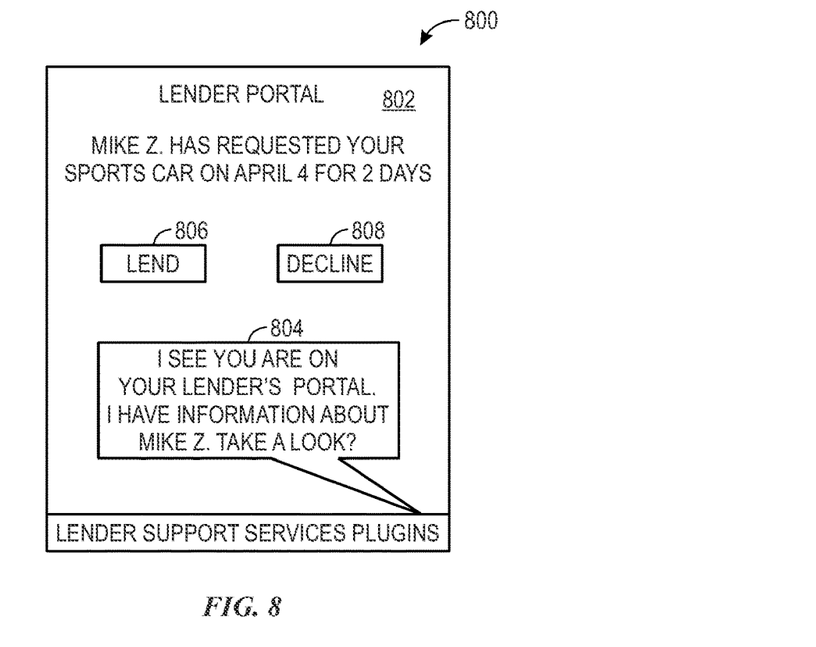
FIG. 8 is a schematic diagram illustrating an example of a browser plugin for implementing the lender support services, according to implementations of the present disclosure.

Turning now to a discussion of the implementation examples of the lender support services, FIG. 8 is a schematic diagram illustrating an example graphical user interface 800 including a browser plugin for implementing the lender support services, according to implementations of the present disclosure. As illustrated, a lender's portal GUI 802 has been navigated to by a user. The Lender Support Services 102 have been implemented, in the current embodiment, as a browser plugin, which upon detecting that the user has browser has navigated to the lender's portal GUI 802, performs the lender support services. For example, in the current embodiment, the browser plug-in traverses the underlying web-page code (e.g., tags) to identify potential lends. Here, user Mike Z is requesting a car for April 2-4, hence the browser plugin identifies a potential lend. Upon identifying the potential lend, the Lender Support Services 102 may perform a risk analysis for the potential lend. Upon identifying the risk, the browser plugin may provide a plugin GUI 804, indicating that risk assessment information has been generated for the potential lend. The user may select an item in the plugin GUI 804 to view the risk assessment results.

Based upon the provided risk assessment results, the lender can decide whether or not to lend out the vehicle. For example, the user can select affordance 806

Figure 9:
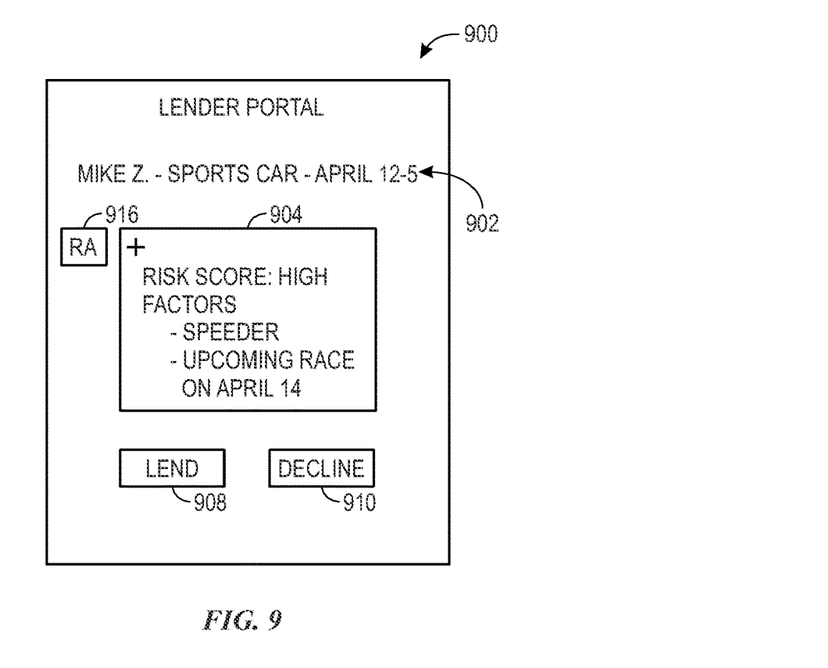
FIG. 9 is a schematic diagram illustrating an example of an inline web page interface for implementing the lender support services, according to implementations of the present disclosure.

FIG. 9 is a schematic diagram illustrating an example GUI 900 of an inline web page interface for implementing the lender support services, according to implementations of the present disclosure. As illustrated, the GUI 900 includes a Lender's portal that provides potential lend indications 902 of a lender's vehicle. For example, in the current embodiment, Mike Z has requested the lender's sports car for April 4-5. As mentioned above, the risk assessment may be triggered based upon a user input requesting this assessment. For example, in the current embodiment, the Vehicle Lending Services Platform 104 provides an in-line risk assessment section 904, proximate to the potential lend indications. In the current embodiment a GUI affordance 906, when selected by a user, triggers the request for risk assessment of the potential lend indication 902. Upon performing a risk assessment, the lender support services 102 may provide the risk assessment results to the vehicle lending services platform 104, which may use code insertion to present the results 908 inline in the GUI 900. For example, in the current embodiment, the results 908 that are presented indicate a high-risk score, due to the lendee having a record of speeding and an upcoming race that is occurring during the dates that the vehicle (a sports car) will be loaned out. Lend affordance 908 can be selected to lend the vehicle or decline affordance 910 can be selected to decline lending of the vehicle.

Technical effects of the present disclosure include supplementing a vehicle lending services platform 104 with additional functionality to facilitate a shared economy of vehicle lending. In particular, data aggregation may be used to obtain and aggregate relevant data from a multitude of electronic services. Machine learning may be implemented on the aggregated data to identify patterns associated with various levels of risk associated with a potential lend of a vehicle. The results of the risk analysis may be quantified and presented, either by the lender support services or the vehicle lending services platform, as described herein.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium, comprising computer-readable instructions that, when executed by one or more processors of a computer, cause the computer to:
   query for and accumulate data relevant to potential use of a vehicle from one or more electronic services;
   perform machine learning on the accumulated data, identifying patterns in the accumulated data indicative of risk;
   identify one or more capabilities of the vehicle indicating that one or more risk mitigation features are customizable for the vehicle, the risk mitigation features comprising: a lane departure system with a dynamically adjustable sensitivity onboard the vehicle, an adjustable speed limiting functionality onboard the vehicle, or both;
   in response to the identified patterns, determine a customization to the one or more risk mitigation features, based upon the one or more capabilities of the vehicle, wherein the customization comprises one or more modifications of the one or more risk mitigation features of the vehicle to alter the dynamically adjustable sensitivity of the lane departure system onboard the vehicle, govern a maximum speed of the vehicle by activating the adjustable speed limiting functionality onboard the vehicle, or both; and
   automatically implement the determined customization comprising the one or more modifications of the one or more risk mitigation features of the vehicle by:
      generating one or more configuration update commands configured to cause implementation of the determined customization comprising the one or more modifications of the one or more risk mitigation features; and
      providing to communications circuitry of the vehicle the one or more generated configuration update commands, the configuration update commands instructing the vehicle to implement the determined customization, resulting in vehicle alteration of the dynamically adjustable sensitivity of the lane departure system onboard the vehicle, activation of the adjustable speed limiting functionality onboard the vehicle, or both.

2. The computer-readable medium of claim 1, comprising computer-readable instructions that, when executed by the one or more processors, cause the computer to:
   query for and accumulate the data from social media services, driver reporting services, banking services, or any combination thereof.

3. The computer-readable medium of claim 1, comprising computer-readable instructions that, when executed by the one or more processors, cause the computer to:
   identify an identity of a potential user of the vehicle;
   wherein the data comprises data specific to the identity.

4. The computer-readable medium of claim 3, wherein the data specific to the identity comprises social media data corresponding to the identity.

5. The computer-readable medium of claim 1, comprising computer-readable instructions that, when executed by the one or more processors, cause the computer to:
   identify a time of the potential use;
   wherein the data comprises data specific to the time.

6. The computer-readable medium of claim 5, wherein the data specific to the time comprises events occurring during at least a portion of the time.

7. The computer-readable medium of claim 6, comprising computer-readable instructions that, when executed by the one or more processors, cause the computer to:
filter the events occurring during at least the portion of the time to events that specifically pertain to a type of vehicle associated with the potential use.

8. The computer-readable medium of claim 1, wherein implementation of the customization is caused by providing the one or more configuration update commands to the vehicle to store data in a data register that causes configuration changes.

9. The computer-readable medium of claim 1, comprising computer-readable instructions that, when executed by the one or more processors, cause the computer to:
receive, from an electronic device, an indication of quality of driving of a user after the vehicle is used by the user; and
updating the accumulated data with the indication of quality for subsequent machine learning.

10. The computer-readable medium of claim 9, wherein the indication of quality of driving of the user is obtained from an onboard diagnostics (OBD) device communicatively coupled to the vehicle.

11. A computer-implemented method, comprising:
querying for and accumulating data relevant to potential use of a vehicle from one or more electronic services;
performing machine learning on the accumulated data, identifying patterns in the accumulated data indicative of risk;
identifying one or more capabilities of the vehicle indicating that one or more risk mitigation features are customizable for the vehicle, the risk mitigation features comprising: a lane departure system with a dynamically adjustable sensitivity onboard the vehicle, and adjustable speed limiting functionality onboard the vehicle, or both;
in response to the identified patterns, determining a customization to the one or more risk mitigation features, based upon the one or more capabilities of the vehicle, wherein the customization comprises one or more modifications of the one or more risk mitigation features of the vehicle to alter the dynamically adjustable sensitivity of the lane departure system onboard the vehicle, govern a maximum speed of the vehicle by activating the adjustable speed limiting functionality onboard the vehicle, or both; and
automatically implementing the determined customization comprising the one or more modifications of the one or more risk mitigation features of the vehicle by:
generating one or more configuration update commands configured to cause implementation of the determined customization comprising the one or more modifications of the one or more risk mitigation features; and
providing to communications circuitry of the vehicle the one or more generated configuration update commands, the configuration update commands instructing the vehicle to implement the determined customization, resulting in vehicle alteration of the dynamically adjustable sensitivity of the lane departure system onboard the vehicle, activation of the adjustable speed limiting functionality onboard the vehicle, or both.

12. The computer-implemented method of claim 11, comprising:
querying for and accumulating the data from social media services, driver reporting services, banking services, or any combination thereof.

13. The computer-implemented method of claim 11, comprising:
identifying an identity of a potential user of the vehicle;
wherein the data comprises data specific to the identity.

14. The computer-implemented method of claim 13, wherein the data specific to the identity comprises social media data corresponding to the identity.

15. The computer-implemented method of claim 11, comprising:
identifying a time of the potential use;
wherein the data comprises data specific to the time, wherein the data specific to the time comprises events occurring during at least a portion of the time.

16. The computer-implemented method of claim 15, comprising:
filtering the events occurring during at least the portion of the time to events that specifically pertain to a type of vehicle associated with the potential use.

17. The computer-implemented method of claim 11, wherein implementation of the customization is caused by providing the one or more configuration update commands to the vehicle to store data in a data register that causes configuration changes.

18. The computer-implemented method of claim 11, comprising:
receiving, from an electronic device, an indication of quality of driving of a user after the vehicle is used by the user; and
updating the accumulated data with the indication of quality for subsequent machine learning, wherein the indication of quality of driving of the user is obtained from an onboard diagnostics (OBD) device communicatively coupled to the vehicle.

19. A system, comprising:
a vehicle comprising:
one or more customizable risk mitigation features comprising a lane departure system with a dynamically adjustable sensitivity onboard the vehicle, an adjustable speed limiting functionality onboard the vehicle, or both; and
communications circuitry; and
a vehicle services platform, comprising one or more processors configured to:
query for and accumulate data relevant to potential use of the vehicle from one or more electronic services;
perform machine learning on the accumulated data, identifying patterns in the accumulated data indicative of risk;
identify the one or more customizable risk mitigation features of the vehicle;
in response to the identified patterns, determine a customization to the one or more customizable risk mitigation features, wherein the customization comprises one or more modifications of the one or more customizable risk mitigation features of the vehicle to alter the dynamically adjustable sensitivity of the lane departure system onboard the vehicle, govern a maximum speed of the vehicle by activating the adjustable speed limiting functionality onboard the vehicle, or both; and automatically implement the determined customization comprising the one or more modifications of the one or more customizable risk mitigation features of the vehicle, by:
  generating one or more configuration update commands configured to cause implementation of the determined customization comprising the one or more modifications of the one or more customizable risk mitigation features; and
  providing to the communications circuitry of the vehicle the one or more generated configuration update commands, the configuration update commands instructing the vehicle to implement the determined customization;
wherein the vehicle is configured to:
  receive, via the communications circuitry, the one or more generated configuration update commands; and
  alter the dynamically adjustable sensitivity of the lane departure system onboard the vehicle, activate the adjustable speed limiting functionality onboard the vehicle, or both, in accordance with the one or more configuration update commands.

20. The system of claim 19, wherein the vehicle comprises a data register storing configuration data for the one or more customizable risk mitigation features, and the vehicle is configured to alter the sensitivity of the dynamically adjustable sensitivity of the lane departure system onboard the vehicle, activate the adjustable speed limiting functionality onboard the vehicle, or both, in accordance with the one or more configuration update commands, by altering the configuration data stored in the data register.

\* \* \* \* \*